United States Patent [19]

Weber

[11] Patent Number: 5,820,313

[45] Date of Patent: Oct. 13, 1998

[54] ROTATING SHAFT TOOL

[76] Inventor: Dieter Weber, Waldstrasse 49, D-72459 Albstadt, Germany

[21] Appl. No.: 755,730

[22] Filed: Nov. 25, 1996

[30] Foreign Application Priority Data

Nov. 29, 1995 [DE] Germany .................. 195 44 378.0

[51] Int. Cl.$^6$ .................................................. B23B 51/06
[52] U.S. Cl. ........................... 408/56; 408/57; 408/226; 408/231; 408/238
[58] Field of Search .................. 408/56, 57, 59, 408/226, 227, 231, 238

[56] References Cited

U.S. PATENT DOCUMENTS

| | | |
|---|---|---|
| 1,713,646 | 5/1929 | Deyo . |
| 3,024,674 | 3/1962 | Jodd . |
| 3,286,557 | 11/1966 | Rietzcer et al. . |
| 3,313,186 | 4/1967 | Rochon .................... 408/57 |
| 4,168,925 | 9/1979 | Dufresne ................... 408/59 |
| 4,640,652 | 2/1987 | Rivera, Jr. ................ 408/59 |
| 5,028,178 | 7/1991 | Ronen ....................... 408/59 |
| 5,048,375 | 9/1991 | Kobayashi ............... 408/226 |
| 5,116,172 | 5/1992 | Koster ..................... 408/226 |
| 5,199,508 | 4/1993 | Miyanaga ................ 408/226 |
| 5,544,985 | 8/1996 | Lane ........................ 408/56 |
| 5,601,386 | 2/1997 | Wells ....................... 408/59 |
| 5,649,714 | 7/1997 | Uchida et al. ............ 408/57 |

FOREIGN PATENT DOCUMENTS

| | | |
|---|---|---|
| 870007 | 10/1981 | Sweden ................... 408/56 |
| 1450929 | 1/1989 | Sweden ................... 408/59 |
| 1611595 | 12/1990 | Sweden ................... 408/56 |
| 546 614 | 3/1974 | Switzerland . |
| 2063 732 | 6/1981 | United Kingdom . |
| 2247852 | 3/1992 | United Kingdom .... 408/56 |

*Primary Examiner*—Steven C. Bishop
*Assistant Examiner*—Adesh Bhargava

[57] ABSTRACT

Rotating shaft tool with a shaft, in which at least one main channel for coolant/lubricant is provided, extending in the longitudinal direction, with a cutter head connected to the shaft and having chip grooves and a groove discharge region, with a sleeve which extends between the groove discharge region and the shaft and which covers at least one feed channel formed between the main channel and the groove discharge, characterized in that the at least one feed channel is provided substantially parallel to the longitudinal mid axis of the shaft and of the cutter head, and has a transition, free from sharp bends, from the main channel to the feed channel and from the feed channel to the groove discharge region.

30 Claims, 1 Drawing Sheet

ROTATING SHAFT TOOL

BACKGROUND OF THE INVENTION

1. Field of the Invention

This invention relates to a rotating shaft tool and more particularly to a rotating shaft tool having a channel for lubricant/coolant extending in the longitudinal direction of the tool shaft.

2. Discussion of Prior Art

A rotating shaft tool consisting of a cylindrical shaft and a cutter head fitted to the shaft is known from Published European Patent Application EP 0 556 801 A1. Chip grooves are introduced into the cutting head, which is constructed as a shaped head, and adjoin a groove discharge region. A main channel for coolant/lubricant is provided in and concentric with the cylindrical shaft in its end region. In the cutting head, at least two branch channels lead out at right angles from the main channel to the outside, where they form respective outlets. These are respectively arranged in the groove discharge region, which is surrounded by a sleeve. The sleeve extends from the shaft as far as the groove mouth region of the cutting head.

A problem in a rotating shaft tools of this kind is that, particularly in the development of small diameter rotating tools, such as for example less than 6.5 mm, such rotating cutting tools cannot withstand the required forces, since at least two branch channel bores arranged at right angles to the main channel greatly weaken the cross section, so that the torsional and also bending stresses cannot be taken up.

Moreover such rotating tools have the disadvantage that a double deflection by 90° of the coolant/lubricant is necessary before it can reach the chip-forming space of the cutter head. In conventional cooling and lubrication, the coolant/lubricant is forced under high pressure through the shaft tool and is fed to the workpiece. Because of the right angled deflections, which are very unfavorable to flow, it is necessary to set the excess pressure even higher so that the coolant/lubricant can be passed through the shaft tool with a sufficient residual pressure.

Moreover such a rotating shaft tool has the disadvantage that minimal amount lubrication is not feasible. In minimal amount lubrication, coolant/lubricant is fed to the cutting head at about 0.5 to 5 ml per hour. In order to obtain such small throughputs of liquid, a mist is formed with a small excess pressure of 2–3 bar, and is enriched with coolant/lubricant particles. When deflections are incorporated, with the resulting bends, the mist can condense out at the deflections, and result in drop formation. This means that uneven lubrication can occur, in which a droplet suddenly releases from a bend and is fed to the chip-forming space, while no coolant/lubricant reaches the chip-forming space in the intervening time.

SUMMARY OF THE INVENTION

The object of the present invention is to provide a rotating shaft tool having a design, favorable to flow, of the channels for the feed of coolant/lubricant, which makes possible both a conventional cooling and lubrication and also a minimal amount lubrication, and which has high strength, even in small diameter shaft tools.

This object is attained by a shaft having at least one main channel for coolant/lubricant extending in the longitudinal direction of the shaft. A cutter head connected to the shaft has chip grooves and a groove discharge region. A sleeve extends between the groove discharge region and the shaft and covers at least one feed channel formed between the main channel and the groove discharge region. At least one feed channel is arranged substantially parallel to a longitudinal middle axis of the shaft and the cutter head. A transition without sharp bends provided from the main channel to the feed channel and from the feed channel to the groove discharge region.

By arrangement of the at least one feed channel substantially parallel to the longitudinal middle axis of the shaft tool, a feed of the coolant/lubricant from a main channel to the chip-forming spaces of the cutting head can be obtained, having no deflections or bends. Very favorable flow conditions can be obtained in this manner. The coolant can flow through the rotating shaft tool without disturbing effects from sharp-edged deflections or angles, so that the coolant/lubricant can reach the cutting head with a substantially laminar flow. This design, favorable to flow, of the feed of coolant/lubricant is particular of importance in minimal amount lubrication, so that no condensation can appear on the shaft tool at a bend or in dead spaces, conditioned by flow, of the channels.

Moreover the design and arrangement of a flow channel according to the invention has the advantage that a rotating shaft tool can also be produced whose cutting head can have a diameter of, for example, less than 6.5 mm. By the arrangement of the feed channels running substantially parallel to the longitudinal middle axis of the shaft tool, cross sections in the shaft region can be obtained, even for small diameters of the shaft tools, which can take up the stresses which arise, for example, in the form of torsional and bending stresses.

Moreover, the design of the rotating shaft tool according to the invention has the advantage the a coolant/lubricant feed is obtained which can be set for all tools which are provided with an inner coolant feed. This can be provided, for example, in reamers with single or multiple blades, in drills, in boring bars, in milling cutters and core drills, in thread cutters and thread groovers, or the like. This is independent of whether the blades are made integral with the cutting head or are provided by inserted cutter plates.

BRIEF DESCRIPTION OF THE DRAWINGS

Preferred embodiments of the invention will now be described taken together with the drawing, in which.

DETAILED DESCRIPTION OF PREFERRED EMBODIMENTS

Figure 1:
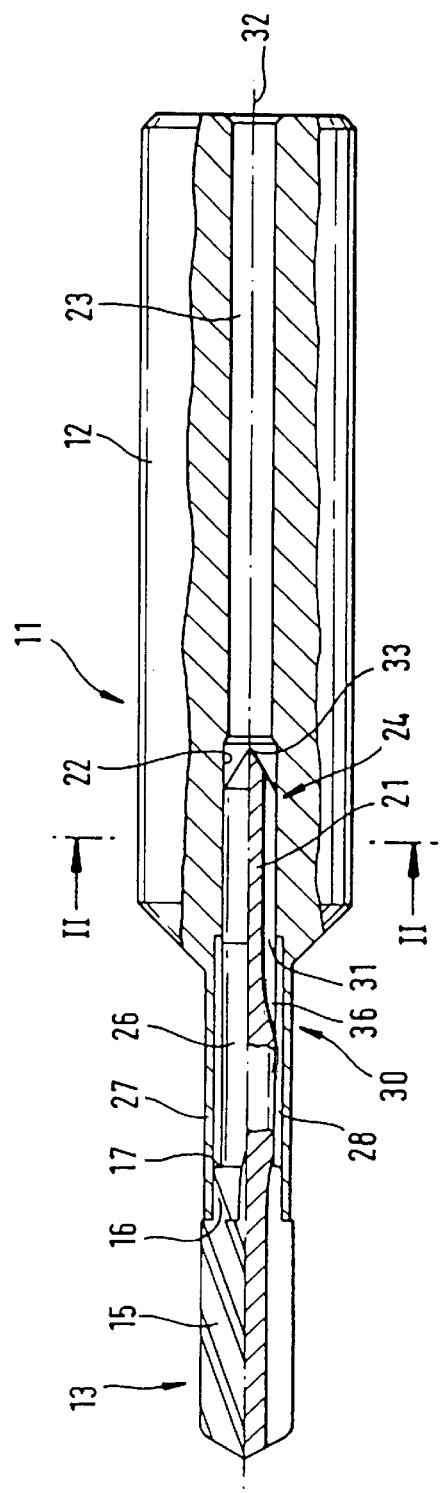
FIG. 1 shows a schematic side view of a rotating shaft tool in partial section.
Figure 2:
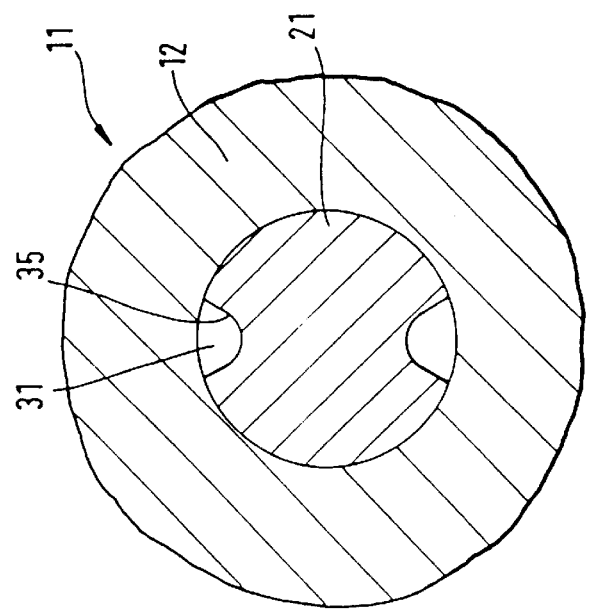
FIG. 2 shows a cross section of the rotating shaft tool along the line II—II in FIG. 1.

A rotating shaft tool 11 is shown in FIGS. 1 and 2 which has a cylindrical shaft 12 and also a cutter head 13 inserted into the cylindrical shaft 12. The cutter head described hereinbelow is produced as a shaped head of a cutting material. Alternatively, a cutter head can be provided which is made of a less high-grade material on which inserted cutter plates are provided. This mode of embodiment is particularly advantageous for cutter heads of large diameter, for example, 15 mm and more.

The cutter head 13 has chip grooves 15 which are adjoined by a groove discharge region 16 of the chip grooves 15. The transition from the chip grooves 15 to the discharge region of the chip grooves 15 is formed by the shoulder 17 of the groove wall, the discharge region 16 of the chip grooves 15 being exclusively located in the cutter head 13.

The cylindrical body 21, with a smaller diameter than the groove discharge region, adjoins the discharge region 16 of the chip grooves 15. The cylindrical body 21 is arranged in a bore of the shaft 12. This bore is slightly larger than a main channel 23 which runs through the shaft 12 in the longitudinal axial direction. The main channel 23 and the bore 22 can also be made equally large. The end region 24 of the cylindrical body 21 is connected to the bore by a form connection. A press fit is advantageously provided between the end region 24 of the cylindrical body 21 and the shaft 12, as further described hereinbelow.

At least one feed channel 30 is provided between the groove discharge region 16 and the main channel 23 of the shaft tool 11. This can be constructed in different ways, as described hereinbelow.

The cylindrical body 21 of the cutter head 13 has a middle region 26 which is covered by a sleeve 27. The sleeve 27 is integrally connected to the shaft 12, and at its free end engages the discharge region 16 of the chip grooves 15. The shoulder 17 delimits toward the cutter head 13 an annular gap 28 formed by the sleeve 27.

The end region 24 of the cylindrical body 21 of the inserted cutter head 13 has a flow channel 31 which runs parallel to a longitudinal mid axis 32 of the shaft tool 11. The flow channel 31 is formed in the cylindrical body 21 in the form of a longitudinal groove 35, of V-shape seen in cross section, the base of the groove being preferably formed as a circular arc. The sides, which run in a straight line, of the V-shaped longitudinal groove 35 can include an angle of 90°±30%, preferably of about 90°. The V-shaped groove 35 has a small depth relative to the diameter of the end region 24, so that a relatively large core diameter can remain, thus tending to provide high strength in order to take up torsional and bending stresses or strains which arise.

In the embodiment, two flow channels 31 are provided, mutually offset by 180°. A transition which is favorable to flow from the main channel 23 into the flow channels 31 can be obtained by forming the free end 33 of the cylindrical body 21 as a conical point. A discharge region 36 is provided at the end of the flow channel 31, forming a flowing transition to the annular gap 28. The floor of the flow channel 31 can then merge at an acute angle into the lateral surface of the annular gap 28, so that a transition from the flow channel 31 into the annular gap 28 is provided which maintains a nearly laminar flow.

The flow channel 31 is formed in the cylindrical body 21 by a grinding process. The geometry of the longitudinal groove 35 as described above is thus particularly advantageous. Moreover, geometries or cross sections which depart from this can be suitable. This is required, since the cutter head 13 is mainly made of high-grade material which cannot be milled. However, this has the advantage that a longitudinal groove 35 can be formed which has a high surface quality, so that the friction of the coolant/lubricant which flows through can be reduced. By this means, also, the flow speed is at least not negatively affected.

The arrangement and design according to the invention of the flow channel 31 between the main channel 23 and the annular gap 28 has the advantage, in particular for shaft tools of a diameter less than 6.5 mm, so that they have a high strength and rigidity. Moreover, this design according to the invention has the advantage that both a conventional cooling and lubrication and also a minimal amount lubrication can be obtained. In minimal amount lubrication, a finely dispersed mist which contains fatty alcohols can flow through the shaft tool 11 as the coolant/lubricant. By the nearly rectilinear design of the feed of the coolant/lubricant without deflections or bends, the mist can be prevented from condensing out at the edges of the deflections or bends or in their dead spaces, so that the coolant/lubricant is not then fed in the form of drops to the chip grooves 15. Thus in this embodiment, the feed channel 30 is formed by a flow channel 31 and an annular section 28.

An alternative embodiment of the shaft tool 11 provides a cutter head with four chip spaces and a cylindrical body 21 with four longitudinal grooves 35, which have four feed channels 30. The feed channels 30 are formed only by the flow channels 31 and can merge directly into the discharge region 16 of the chip grooves 15, so that a flow channel 31 is provided for each chip groove 15. The number of feed channels 30 can be matched to the number of the chip grooves 15.

The shaft tool 11 according to FIG. 1 is made in two parts. To insert the cutter head 13 in the shaft 12, the shaft 12 is heated to a temperature region between 300° and 800° C., so that the internal diameter of the sleeve 27 and of the bore 22 can become larger. The cutter head 13 is then inserted, so that the sleeve 27 at least partially covers the chip discharge region 16 and the end region 24 of the cylindrical body 21 is positioned in the bore 22. On cooling, the shaft 22 shrinks onto the cutter head 13. Alternatively, further form connections can be obtained. Material connections by adhesion or soldering, such as for example soft soldering or brazing, can be provided.

By the design of the feed channels 30, particularly the flow channels 31, both the shaft 12 and the cutter head 13 can be constructed with simple geometries, making cost-effective production possible.

According to a further alternative embodiment of the shaft tool 11, the sleeve can be produced separately from the shaft 12 and can be joined to the shaft by means of a non-positive and/or positive connection, or else by a material connection.

The simple geometry of the shaft 12 and also of the cutter head 13 makes it possible, when they are combined to form a shaft tool 11, for the flow channels 31 to be formed. The longitudinal grooves 35 can thus be formed by a simple grinding process in a cutter head which preferably consists of HSS, hard metal, or cermet.

The production of the flow channels 31 is simplified, in the case of cutter heads with inserted cutter plates, since the shaped head is then mostly made of a non-cutting material, and milling of the grooves is then possible. A shaft tool 11 as described in FIGS. 1 and 2 is particularly suitable for reaming. The shaft tool 11 can then have a rotary speed up to more than 10,000 rpm. Moreover, the design of the coolant feed according to the invention can be provided for rotating tools which have a cutter head diameter of greater than 2.5 mm.

I claim:

1. A rotating shaft tool comprising:
   a shaft (12) having at least one main channel (23) for at least one of coolant and lubricant extending in a longitudinal direction of said shaft (12),
   a cutterhead (13) connected to said shaft (12) an having chip grooves (15) and a groove discharge region (16),
   a sleeve (27) extending between said groove discharge region (16) and said shaft (12) and covering at least one feed channel (30) formed between said main channel (23) and said groove discharge region (16),
   wherein said at least one feed channel (30) is arranged substantially parallel to a longitudinal middle axis (32)

of said shaft (12) and said cutter head (13), and a transition is provided from said main channel (23) to said feed channel (30) and from said feed channel (30) to said discharge region (16), without sharp bends.

2. The rotating shaft tool according to claim 1, wherein said cutter head (13) includes a cylindrical body (21) positioned in a bore (22) of said shaft (12), and said feed channel (30) is formed at least in part by at least one flow channel (31) formed between said cylindrical body (21) and said bore (22).

3. The rotating shaft tool according to claim 2, wherein an angular gap (28) formed by said sleeve (27) is provided between said flow channel (31) and said groove discharge region (16).

4. The rotating shaft tool according to claim 1, wherein said cutter head (13) includes a cylindrical body (21) with an end region (24) having at least one longitudinal groove (35) that forms a flow channel (31) in combination with said shaft body (12).

5. The rotating shaft tool according to claim 4, comprising at least two mutually offset longitudinal grooves (35).

6. The rotating shaft tool according to claim 5, wherein said longitudinal grooves are offset by 180 degrees.

7. The rotating shaft tool according to claim 4, wherein said at least one longitudinal groove (35) has a substantially v-shaped cross section and sides arranged at an angle between 45 degrees and 135 degrees.

8. The rotating shaft according to claim 4, wherein said at least one longitudinal groove (35) has a substantially v-shaped cross section and sides arranged at an angle in the range of 90 degrees plus or minus 30 percent.

9. The rotating shaft according to claim 4, wherein said at least one longitudinal groove (35) has a substantially v-shaped cross section and sides at an angle of about 90 degrees.

10. The rotating shaft according to claim 4, wherein said at least one longitudinal groove (35) has a groove floor with a substantially circular arcurate form.

11. The rotating shaft according to claim 1, wherein said cutter head (13) includes a cylindrical body (21) having an conical shaped end region (24) with a free end (33) projecting into said main channel (23).

12. The rotating shaft according to claim 1, wherein said cutter head (13) comprises a cylindrical body (21) having a spherical shaped end region (24) with a free end (33) projecting into said main channel (23).

13. The rotating shaft according to claim 2, wherein said flow channel (31) has a discharge region (36) associated with said sleeve (27) and arranged at an acute angle to a lateral surface of said cylindrical body (21).

14. The rotating shaft according to claim 2, comprising a region for easy flow of said at least one of coolant and lubricant between a discharge region (36) of said flow channel (31), and a lateral surface of said cylindrical body (21).

15. The rotating shaft according to claim 14, wherein said easy flow region is rounded.

16. The rotating shaft according to claim 13, wherein said chip grooves (15) are directly associated with said discharge region (36) of said flow channel (31).

17. The rotating shaft according to claim 2, wherein a flow channel (31) is associated with each chip groove (15).

18. The rotating shaft according to claim 1, wherein said sleeve (27) is integral with said shaft (12).

19. The rotating shaft according to claim 1, wherein said cutter head (13) is fastened to said shaft (12) with a form connection.

20. The rotating shaft according to claim 1, wherein said cutterhead (13) is fastened to said shaft (12) with a press fit.

21. The rotating shaft according to claim 1, wherein said cutter head (13) is fastened to said shaft (12) with a material connection.

22. The rotating shaft according to claim 1, wherein said cutter head (13) is fastened to said shaft (12) with an adhesive connection.

23. The rotating shaft according to claim 1, wherein said cutter head (13) is fastened to said shaft (12) with a solder connection.

24. The rotating shaft according to claim 23, wherein said cutter head (13) is fastened to said shaft (12) by soft soldering or brazing.

25. The rotating shaft according to claim 1, wherein said cutter head (13) is fastened to said shaft (12) with a press fit in which said shaft (12) and said sleeve (27) have been heated to a temperature between 300 degrees C. and 800 degrees C. for insertion of said cutter head (13) into said shaft (12).

26. The rotating shaft according to claim 1, wherein said cutter head (13) comprises a cylindrical body (21) having an end region (24) including ground longitudinal grooves (35).

27. The rotating shaft according to claim 1, wherein said sleeve (27) and said shaft (12) are form connected together.

28. The rotating shaft according to claim 1, wherein said sleeve (27) and said shaft (12) are connected together with a material connection.

29. The rotating shaft according to claim 1, wherein said cutter head (13) comprises a shaped body of non-cutting material having cutter plates inserted thereon.

30. The rotating shaft according to claim 1, wherein said rotating shaft tool comprises a reaming tool.

* * * * *